(12) United States Patent
Giustina et al.

(10) Patent No.: US 9,374,752 B2
(45) Date of Patent: Jun. 21, 2016

(54) CONTROLLING MOBILITY IN CELLULAR NETWORKS

(75) Inventors: Andrea Giustina, Milan (IT); Housam Al Housami, Wilshire (GB)

(73) Assignee: Ubiquisys Limited, Swindon (GB)

(*) Notice: Subject to any disclaimer, the term of this patent is extended or adjusted under 35 U.S.C. 154(b) by 925 days.

(21) Appl. No.: 13/502,715

(22) PCT Filed: Oct. 18, 2010

(86) PCT No.: PCT/GB2010/051756
§ 371 (c)(1),
(2), (4) Date: Jul. 11, 2012

(87) PCT Pub. No.: WO2011/048410
PCT Pub. Date: Apr. 28, 2011

(65) Prior Publication Data
US 2012/0282931 A1    Nov. 8, 2012

(30) Foreign Application Priority Data

Oct. 19, 2009    (GB) .................................... 0918215.5

(51) Int. Cl.
*H04W 36/00*    (2009.01)
*H04W 36/22*    (2009.01)
*H04W 16/08*    (2009.01)

(52) U.S. Cl.
CPC .............. *H04W 36/22* (2013.01); *H04W 16/08* (2013.01); *H04W 36/0055* (2013.01)

(58) Field of Classification Search
CPC ......... H04L 67/18; H04L 67/22; H04W 4/02; H04W 4/028; H04W 8/10
USPC ........... 455/525, 456.1, 404.1, 441, 437, 440, 455/517, 411, 436, 422.1, 438, 507
See application file for complete search history.

(56) References Cited

U.S. PATENT DOCUMENTS 7,515,557 B1 *  4/2009  Bims ............................. 370/315
8,270,991 B2 *  9/2012  Zhao ........................... 455/452.2

(Continued)

FOREIGN PATENT DOCUMENTS

CN    1319959 A    10/2001
CN    1791277 A     6/2006

(Continued)

OTHER PUBLICATIONS

3GPP TS 32.410 V9.0.0 (Sep. 2009) 3rd Generation Partnership Project; Technical Specification Group Services and System Aspects; Telecommunication management; Key Performance Indicators (KPI) for UMTS and GSM (Release 9).*

(Continued)

*Primary Examiner* — Joseph Arevalo
(74) *Attorney, Agent, or Firm* — Weaver Austin Villeneuve & Sampson LLP (57)    ABSTRACT

A cellular basestation can select its own mobility parameters in order to achieve desirable effects in terms of the overall network performance. When a cellular basestation forms part of a group of such basestations on a single local area network, it can receive information from the other basestations in the group, for example relating to the loading on the other basestations, and can use this information in order to set mobility parameters. Where the basestation receives loading information from other basestations in the group, it can set mobility parameters so that a user equipment device becomes less likely to select a more highly loaded cell, and more likely to select a less highly loaded cell.

7 Claims, 4 Drawing Sheets

(56) References Cited

U.S. PATENT DOCUMENTS

| | | | |
|---|---|---|---|
| 2005/0221828 A1 | 10/2005 | Wakuta et al. | |
| 2006/0166677 A1 | 7/2006 | Derakhshan et al. | |
| 2009/0156210 A1 | 6/2009 | Ponce De Leon et al. | |
| 2010/0159945 A1* | 6/2010 | Brisebois | 455/456.1 |
| 2011/0039564 A1* | 2/2011 | Johnstone | H04W 36/22 455/436 |
| 2011/0170518 A1* | 7/2011 | Randriamasy et al. | 370/331 |

FOREIGN PATENT DOCUMENTS

| | | |
|---|---|---|
| CN | 1812286 | 8/2006 |
| CN | 1934800 A | 3/2007 |
| CN | 1972518 A | 5/2007 |
| CN | 101378343 A | 3/2009 |
| EP | 0781005 | 6/1997 |
| EP | 1133208 | 9/2001 |
| EP | 1137309 A2 | 9/2001 |
| EP | 22207383 | 7/2010 |
| GB | 2397469 | 7/2004 |
| GB | 2456882 | 8/2009 |
| GB | 2467351 | 8/2010 |
| JP | 2008-016970 | 1/2008 |
| WO | WO 97/32445 | 9/1997 |
| WO | WO 02/32157 | 4/2002 |
| WO | WO2007/105999 | 9/2007 |
| WO | WO2008/157573 | 12/2008 |
| WO | WO 2009/002241 | 12/2008 |
| WO | WO 2009002241 A1 * | 12/2008 ............ H04W 36/22 |
| WO | WO 2009/020874 | 2/2009 |
| WO | WO 2009/025494 | 2/2009 |
| WO | WO 2009/131337 | 10/2009 |

OTHER PUBLICATIONS

JP Office Action dated Apr. 7, 2014 for JP Application No. 2012-534775.

CN Office Action dated May 28, 2014 for CN Application No. 201080055425.2.

Qualcomm Europe, Measurement and mobility issues for home (e)Node Bs, publ. 2007, 3GPP tsg_ran/WG2_RL2_TSGR2_59bis (XP050136747).

Telecom Italia, Orange, "Self-optimization use case: self-tuning of cell reselection parameters for load balancing," (R-071432) 3GPP TSG RAN WG3 Meeting #57, Athens, Aug. 20-24, 2007.

International Preliminary Report on Patentability dated May 3, 2012, PCT Applicaton No. PCT/GB2010/051756.

International Search Report dated Mar. 22, 2011, PCT Application No. PCT/GB2010/051756.

$3^{rd}$ Generation Partnership Project, Technical Specification Group Radio Access Network; Evolved Universal Terrestrial Radio Access Network, Sep. 1, 2009, pp. 1-22.

Huawei, "Principles for intra frequency load balancing", 3GPP Draft: R3-08116, Mobile Competence Centre; 650, Route Des Lucioles; F-06921 Sophia-Antipolis Cedex; France, vol. RAN WG3, Apr. 30, 2008.

UK Search Report dated Jan. 5, 2010, Application No. GB0918215.5.

UK Search Report dated Nov. 11, 2010, Application No. GB0918215.5.

UK Examination Report dated Jan. 3, 2013 for GB Application No. GB0918215.5.

Technical Report 2009-093rd Generation Partnership Project (3GPP). Technical Specification Group Radio Access Network; Evolved Universal Terrestrial Radio Access Network (E-UTRAN); Self-configuring and self-optimizing network use cases and solutions (Release 9) (XP050377).

CN Office Action dated Aug. 17, 2015 for CN Application No. 201080055425.2.

CN Office Action dated Feb. 9, 2015 for CN Application No. 201080055425.2.

* cited by examiner

CONTROLLING MOBILITY IN CELLULAR NETWORKS

This invention relates to controlling mobility in cellular networks, and in particular to methods and systems whereby a cellular basestation can select its own mobility parameters to achieve desirable results in overall network performance.

It is known to establish femtocell access points in a building, in order to provide improved coverage for users of a cellular communication network, amongst other advantages. When a registered user device is within the coverage area of a femtocell access point, it can establish a connection with that access point, with the connection from the access point into the core network of the cellular network being established over a pre-existing broadband internet connection, for example. When the user leaves the coverage area of the femtocell access point, the connection can be handed over to a macrocell base station of the cellular network.

It is also known to establish a network of such femtocell access points.

One issue that arises with femtocell access points, and other cellular basestations, relates to mobility. Each user equipment device needs to establish an acceptably strong connection with a cellular basestation, in order to obtain good cellular service. However, handing over from one cell to another while in connected mode, or selecting a different cell while not in connected mode, incur a penalty in terms of efficiency, and so steps are typically taken such that a user equipment device maintains a connection with a basestation that does not at that moment provide the strongest signal. In addition, there may be other reasons why it would be advantageous for a user equipment to establish a connection with one basestation rather than another.

These problems may be solved by allowing a cellular basestation to make a suitable selection of one or more mobility parameters.

According to a first aspect of the present invention, there is provided a method, for use in a basestation of a cellular communications network comprising a plurality of other basestations, for controlling mobility, the method comprising, in the basestation:
  receiving from one of the other basestations a report relating to a load on the one of the other basestations;
  setting a value for at least one mobility parameter determining mobility between the basestation and the one of the other basestations, based on said reported load; and
  broadcasting the set value for the mobility parameter.

According to a second aspect of the present invention, there is provided a method, for use in a basestation of a cellular communications network comprising a plurality of other basestations, for controlling mobility, the method comprising, in the basestation:
  determining a load on the basestation;
  setting a value for at least one mobility parameter determining mobility between the basestation and the other basestations, based on said determined load; and
  broadcasting the set value for the mobility parameter.

According to a third aspect of the present invention, there is provided a method, for use in a basestation of a cellular communications network comprising a plurality of other basestations, for controlling mobility, the method comprising, in the basestation:
  determining a success rate for previous handover attempts to one of the other basestations;
  setting a value for at least one mobility parameter determining mobility between the basestation and the one of the other basestations, based on said determined success rate; and
  broadcasting the set value for the mobility parameter.

According to a fourth aspect of the present invention, there is provided a method for controlling mobility, for use in a basestation of a cellular communications network comprising a plurality of other basestations, wherein the basestation is operating on a first carrier frequency, the method comprising:
  determining whether another of the basestations is operating on the first carrier frequency;
  if the other of the basestations is operating on the first carrier frequency, setting a mobility parameter to a first value;
  if the other of the basestations is not operating on the first carrier frequency, determining a quality of signals received from the other of the basestations;
  if the quality of signals received from the other of the basestations is higher than a threshold, setting the mobility parameter to a second value;
  if the quality of signals received from the other of the basestations is lower than a threshold, setting the mobility parameter to a third value, wherein the third value is different from the second value; and
  broadcasting the set value for the mobility parameter.

According to a fifth aspect of the present invention, there is provided a method for controlling mobility, for use in a femtocell basestation of a cellular communications network comprising a plurality of other femtocell basestations and a plurality of macrocell basestations,
  wherein the femtocell basestation is operating on a first carrier frequency, and
  wherein the femtocell basestation broadcasts a mobility parameter, for use by a user equipment device that is being served by the femtocell basestation in determining when the user equipment device should start making quality measurements on neighbour cells;
  the method comprising:
  when the macrocell basestations are operating on the first carrier frequency, setting the mobility parameter to a first value; and
  when the macrocell basestations are operating on a second carrier frequency different from the first carrier frequency, setting the mobility parameter to a second value that differs from the first value in the sense of making it more likely that the user equipment device will start making quality measurements on neighbour cells.

According to a sixth aspect of the present invention, there is provided a method for controlling mobility, for use in a femtocell basestation of a cellular communications network comprising a plurality of other femtocell basestations and a plurality of macrocell basestations,
  wherein the femtocell basestation is operating on a first carrier frequency, and
  wherein the femtocell basestation broadcasts a mobility parameter, for use by a user equipment device that is being served by the femtocell basestation in determining when the user equipment device should start making quality measurements on neighbour cells;
  the method comprising:
  when the other femtocell basestations and the macrocell basestations are operating on a second carrier frequency different from the first carrier frequency, setting the mobility parameter to a first value; and
  when the other femtocell basestations are operating on a second carrier frequency different from the first carrier frequency, and the macrocell basestations are not operating on the second carrier frequency, setting the mobility parameter to a second value that differs from the first value in the sense of making it more likely that the user equipment device will start making quality measurements on neighbour cells.

According to other aspects of the invention, there are provided basestations operating in accordance with these methods.

Thus, in an embodiment of the invention, each access point will automatically select various mobility parameters that determine the mobility of user equipment devices in the coverage area of the group of access points.

For a better understanding of the present invention, and to show how it may be put into effect, reference will now be made, by way of example, to the accompanying drawings, in which.

Figure 1:
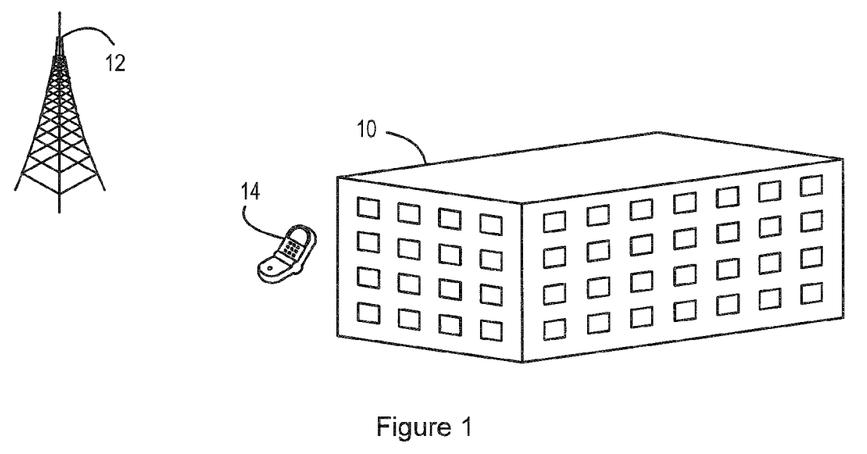
FIG. 1 shows a building in a coverage area of a cellular communications network.

FIG. 1 shows a building 10, which is located within the coverage area of a macrocell base station 12 of a cellular communications network. Thus, user devices, such as mobile phones 14, laptop computers and the like, that are in the vicinity of the building 10 can obtain a cellular service by establishing a connection into the cellular network through the macrocell base station 12.

However, it is known that cellular coverage within buildings can be poor, leading to unavailability of service, or forcing user devices to transmit signals at high transmit powers, leading to shorter battery life.

Femtocell access points are therefore deployed within the building 10, with the intention that user devices located within the building at least should be able to obtain a cellular service by establishing a connection into the cellular network through one of the femtocell access points.

Although the invention is described herein with reference to the deployment of femtocell access points within a building, within which users are expected to circulate, such as an office building, an educational establishment, or a shopping mall, it will be apparent that the invention is applicable to other situations. For example, the invention is equally applicable to outdoor deployment of femtocell access points, especially but not exclusively in locations where there is common ownership and/or management of an area in which users are expected to circulate.

Figure 2:
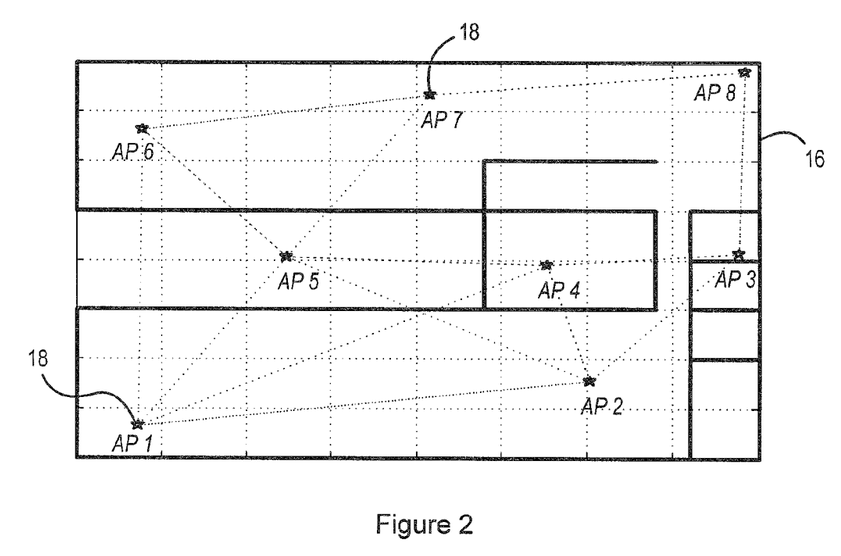
FIG. 2 shows the deployment of multiple femtocell access points in the building.

FIG. 2 is a schematic representation of one level 16 within the interior of the building 10. In this example, the building 10 is an office building, and the whole of the level 16 is occupied by a single corporate entity. Based on the number of expected users within the level 16 at any one time, a suitable number of femtocell access points 18 are deployed. The eight femtocell access points shown in FIG. 2 are indicated as AP1-AP8.

The femtocell access points 18 are located in suitable positions. For example, it may be appropriate to provide a femtocell access point close to the or each entrance/exit point, so that users entering or leaving the building can spend as long as possible connected to one of the femtocell access points. One or more of the femtocell access points in the entrance/exit points of the building, such as the access point AP5, can be designated as a 'gateway' cell, in that it provide the gateway to the femtocell network from the surrounding macro layer. In addition, the femtocell access points should be distributed throughout the space, so that any user within the space will be able to establish a connection with one of the femtocell access points.

Figure 3:
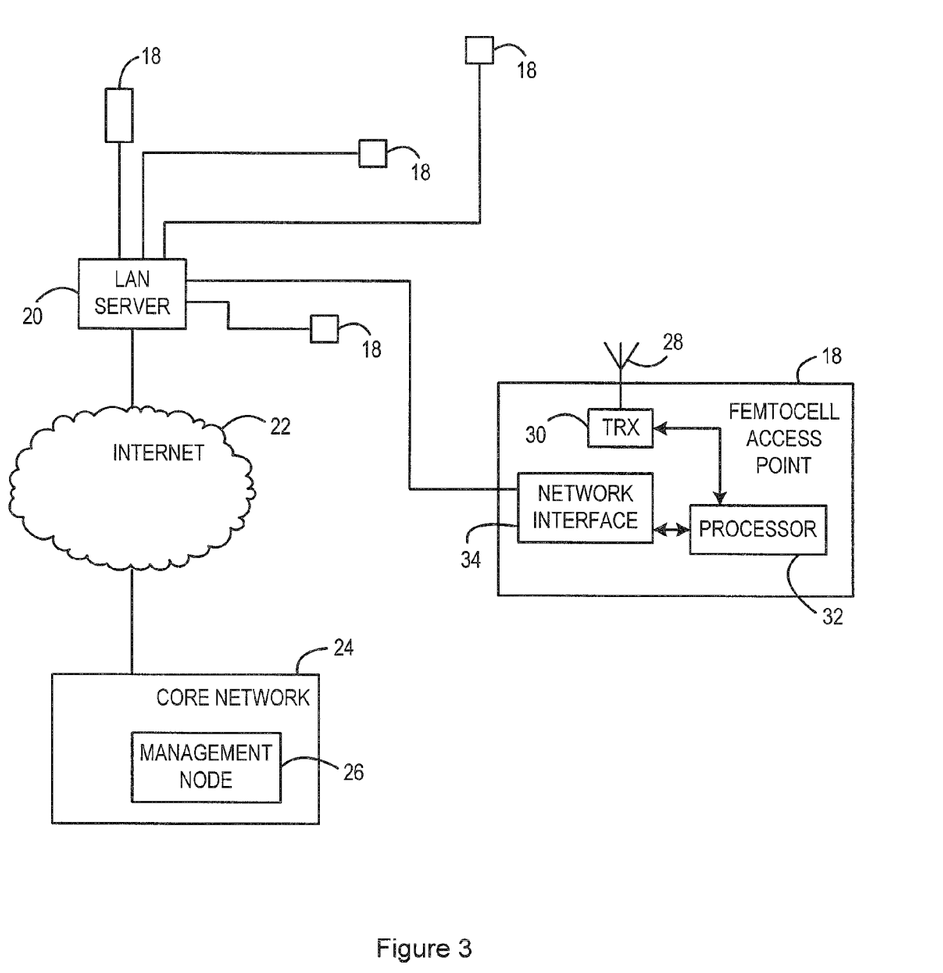
FIG. 3 is a schematic illustration showing the presence of femtocell access points in a wider communications network.

FIG. 3 is a schematic diagram, illustrating network connections of the femtocell access points. Specifically, the femtocell access points 18 in a group are all connected to a local area network (LAN) having a LAN server 20, which also has a connection to a wide area network 22, in particular a public wide area network such as the internet. The femtocell access points 18 are able to connect over the wide area network 22 to a core network 24 of the cellular communications network. The core network 24 includes a management node 26, which monitors and controls where necessary the operation of the femtocell access points 18.

In one embodiment of the invention, the management node 26 distributes to all femtocell access points 18 in the group the relevant information about the group, including: the IDs of all femtocell access points in the group; and their main RF parameters, such as the UTRA Absolute RF Channel Number (UARFCN) and scrambling code (SC), the Location Area Code (LAC) and Cell-ID, and the initial power levels.

In FIG. 3, the structure of one of the femtocell access points 18 is shown in more detail, it being understood that this is described only so far as is necessary for an understanding of the present invention, and that the other femtocell access points 18 may be substantially similar at this level of detail.

Thus, the femtocell access point 18 has an antenna 28, allowing it to transmit and receive signals from other devices in its vicinity. The antenna 28 is connected to transceiver (TRX) circuitry 30, which enables communications using the appropriate cellular standard, for example the UMTS standard maintained by the 3GPP. The TRX circuitry 30 is connected to a processor 32, which in turn is connected to a network interface 34, which enables communications over the local area network, and ultimately over the wide area network 22. The processor 32 controls the operation of the femtocell access point 18, and in particular controls the setting of various mobility parameters, as described in more detail below.

In normal use, the processor 32 controls the operation of the TRX circuitry 30, such that it transmits signals on an allocated system downlink frequency and receives signals on an allocated system uplink frequency. However, the femtocell access point also has a downlink monitor mode, in which it receives signals transmitted on any system downlink frequency, no that it can detect signals transmitted by other femtocell access points, to capture the identities of the neighbouring femtocell access points. Thus, by matching the detected UARFCN/SC and LAC/Cell-ID transmitted by each femtocell access point with the information received from the management node 26, the femtocell access point 18 is able to populate automatically the neighbour table. This can then be used in the case of handovers for local mobility. Thus, mobility within the group is fully supported. Cell-reselection with other femtocell access points is achieved by each broadcasting the relevant carrier and scrambling code information. Handover from one femtocell access point to another can be achieved because each femtocell access point has a full map of its neighbour femtocell access points, including their IDs, and so it can send a handover command that is unequivocally pointing to a specific femtocell access point. Full support is provided for circuit-switched (CS), packet-switched (PS) and multiple Radio Access Bearer (Multi-RAB) call mobility, and for intra-frequency and inter-frequency handovers between femtocell access points.

In addition, each femtocell access point receives periodic measurement reports from its connected user equipments, with these reports indicating the signal strengths of intra-frequency neighbouring femtocell access points. Further, each femtocell access point sends measurement control messages to its connected user equipments that are operating in compressed mode, requiring them to provide periodic measurements of their inter-frequency neighbouring femtocell access points.

Further, each femtocell access point is able to communicate with the other femtocell access points by means of the local area network to which they are connected.

For example, the femtocell access point makes some decisions based on information received from other femtocell access points, relating to the loading of those other femtocell access points, that is, for example, the number of calls being handled by those femtocell access points. Similarly, the femtocell access point 18 transmits information on its own loading to the other femtocell access points, so that they can use this information in processes similar to those described herein. This transmission might most conveniently take place over the local area network, but can take place over the wireless network if preferred. Information on other relevant operational parameters can be exchanged in the same way.

Figure 4:
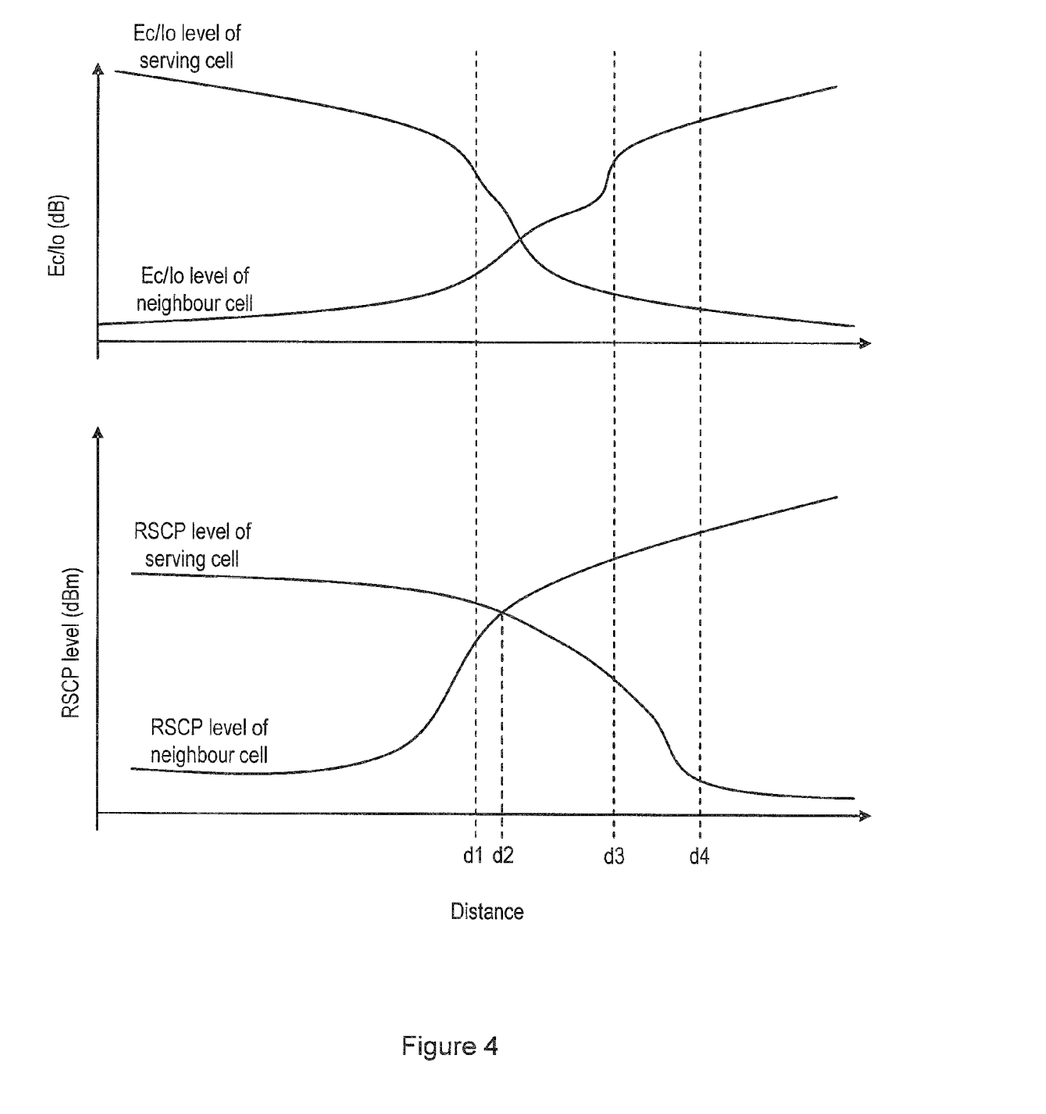
FIG. 4 is a schematic illustration of a situation in which the present invention may be used.

FIG. 4 illustrates in general terms the issues that arise with mobility of a user equipment device (UE) in a cellular network. The algorithm for cell reselection to be used by a UE in a UTRAN cell is defined in section 5.2.6.1 of 3GPP TS 25.304. The serving cell (i.e. the cell which the UE has chosen to camp on) broadcasts neighbour cell lists (System Information Block (SIB) 11 for idle mode and usually SIB 12 for connected mode). The lists may include UTRAN intra-frequency neighbours, UTRAN inter-frequency neighbours, or GSM neighbours. Only these cells are considered by the UE for the purpose of the cell reselection procedure.

FIG. 4 illustrates a situation where a UE starts in a position relatively close to its serving cell, and moves away from the serving cell towards a neighbour cell, and hence the distance axis is also a measure of time. The mobility is determined by measurements of the CPICH Ec/Io (a measure of the power in the pilot channel of a cell) and of the CPICH RSCP (the Received Signal Code Power of the pilot channel), and so both of these are shown in FIG. 4.

In accordance with the standard, CPICH Ec/o is used as a measurement trigger criterion. Thus, while the UE is relatively close to the serving cell, it continuously makes a measurement of the Ec/Io value, for use in calculating a measure of the serving cell's quality.

The quality measure is defined as the parameter Squal, where:

$$Squal = Qqual_{meas} - Qqualmin$$

where:

$Qqual_{meas}$ the measured received quality in terms of the serving cell's CPICH Ec/Io, and Qqualmin is the minimum received signal quality defined for the cell. This quantity is broadcast by the serving cell in a broadcast information message. For example, if this value is −15 dB, then this is the minimum acceptable signal quality for that cell.

A neighbour cell measurement is triggered if any of the following conditions are met:

If: Squal≤Sintrasearch, the UE will perform an intra-frequency measurement based on the neighbour cell list received from the serving cell.

If: Squal≤Sintersearch, the UE will perform an inter-frequency measurement based on the neighbour cell list received from the serving cell.

If: Squal≤SsearchRATm, the UE will perform a measurement on the list of cells of RAT type m that the UE received from the serving cell.

The parameter values Sintrasearch, Sintersearch, and SsearchRATm are all communicated by the serving cell in SIB3/4 broadcast messages.

Thus, in FIG. 4, the UE reaches a point at distance d1 at which the measured Ec/Io of the serving cell falls to a value at which Squal≤Sintersearch.

The UE now begins making the measurements that allow it to determine when to perform a cell reselection. More specifically, the UE makes measurements on various neighbour cells (the situation regarding only one neighbour cell being illustrated in FIG. 4), while continuing to make measurements on the serving cell, so that it can make a decision on which cell to reselect based on these measurements. In order to do this, the UE needs to rank the neighbour cells in order as defined for example by 3GPP 25.304.

Firstly, the serving cell can define which RF quantity is used in the cell reselection algorithm when UTRAN candidate cells are concerned. This can be either CPICH Ec/Io or RSCP (for GSM cells only RSSI is used).

If CPICH RSCP is used, as shown in FIG. 4, rankings are obtained for the serving cell and each possible neighbour cell.

The serving cell ranking is defined as: Rs=CPICH RSCP+Qhyst1,s

Each neighbour UMTS cell ranking is defined as: Rn=CPICH RSCP−Qoffset1s,n

Each neighbour GSM cell ranking is defined as: Rn=CPICH RSSI−Qoffset1s,n where:

$Qhyst1_s$ specifies the hysteresis value for the serving cell (s), and $Qoffset1_{s,n}$ specifies the offset between the serving cell (s) and the neighbour (n).

However, if Ec/Io is used (for FDD cells) and an FDD cell happened to be ranked as the best cell, than another evaluation round is performed where FDD cells are ranked as follows:

The serving cell ranking is defined as: Rs=CPICH Ec/Io+Qhyst2,s

Each neighbour cell ranking is defined as: Rn=CPICH Ec/Io−Qoffset2s,n

Where:

$Qhyst2_s$ specifies the hysteresis value for the serving cell (s), when Ec/Io is used as a quality criterion, and $Qoffset2_{s,n}$ specifies the offset between the serving cell (s) and the neighbour (n), when Ec/Io is used as a quality criterion.

The parameters: Qhyst1,s, Qoffset1s,n, Qhyst2,s and Qoffset2s,n are all broadcast by the serving cell in its System Information Blocks. It should be noted that there is one Qhyst value broadcast by each serving cell, while there are many Qoffset values, one for each neighbour cell.

If a cell other than the serving cell is evaluated as having the highest ranking of any cell for longer than a time interval Treselection, then the UE will reselect to that cell, where: Treselection is also a parameter broadcast by the serving cell.

Thus, FIG. 4 shows the situation where the UE starts making measurements at the distance d1, and the serving cell remains the highest ranked cell throughout the range d1-d3, even though the neighbour cell had a higher RSCP value from the distance d2 onwards.

At the distance d3, the neighbour cell becomes the best ranked cell, and so a timer is started and, after the time parameter Treselection has expired, at the distance d4, the UE reselects to the neighbour cell.

As described in more detail below, each femtocell access point is able to set its various parameters, in order to affect the mobility of connected user equipment devices, in order to achieve desirable results.

When a femtocell access point becomes active, it will go through a scanning procedure in order to identify any neighbours in the vicinity of the femtocell. It will also get detailed information about other femtocells that belong to the enterprise. This information can be shared between femtocells either directly over the air or using Peer-to-peer communication over the local area network. For each detected or inferred neighbour, the femtocell access point will take notice of the frequency being used by that neighbour. If the neighbour's radio is detected, the femtocell access point will also read all the cell reselection parameters broadcast by that neighbour.

The femtocell access point will then set its own cell reselection parameters. This can happen in two stages, firstly at start-up based on data collected during the start-up process, and secondly periodically in reaction to changes in the network.

Figure 5:
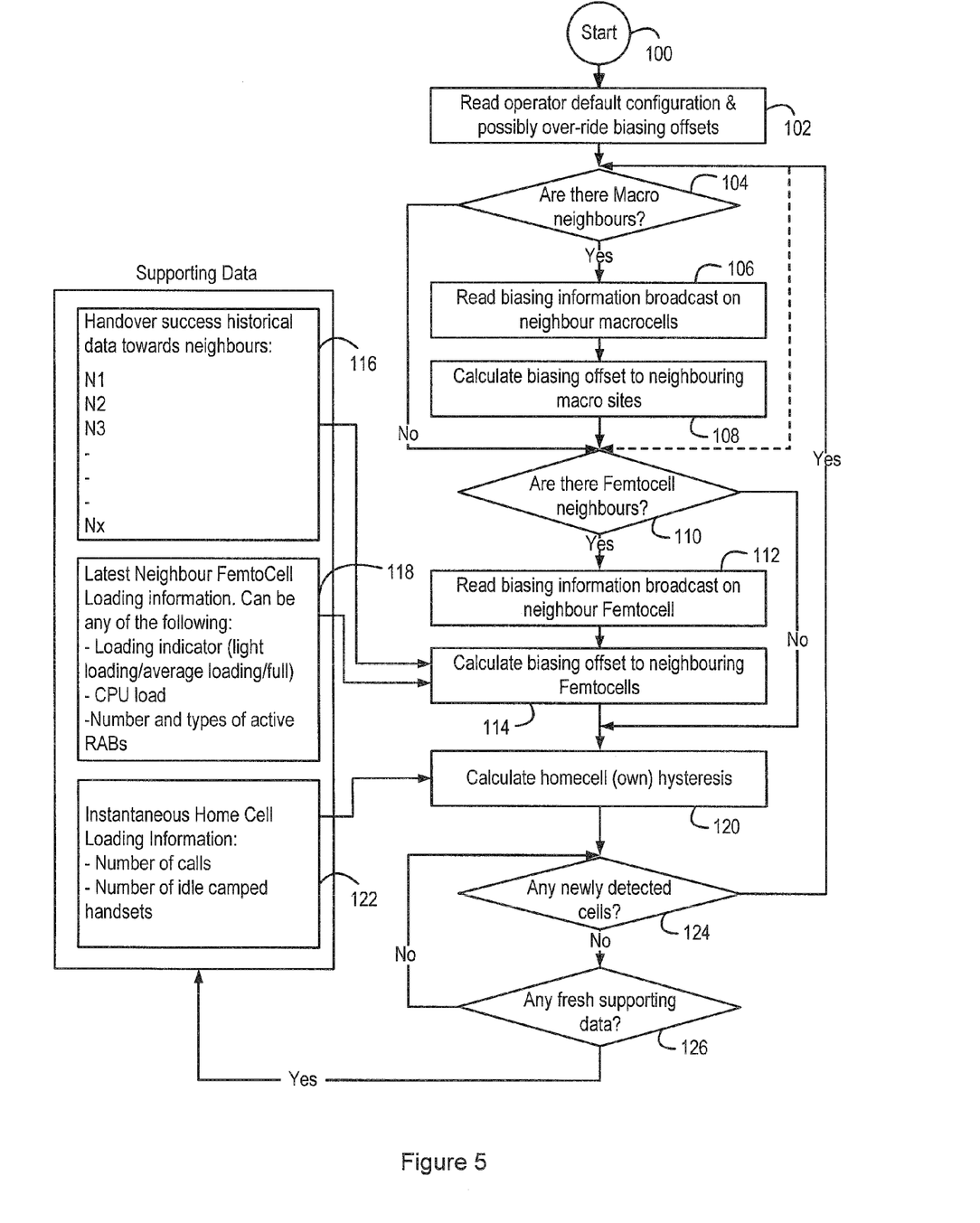
FIG. 5 is a flow chart illustrating a first process in accordance with the present invention.

FIG. 5 is a flow chart, illustrating the procedure performed in the femtocell access point.

The procedure starts at step 100, and moves to step 102, in which the femtocell access point reads the default configuration set by the mobile network operator. The configuration set by the operator can determine whether the mobility control methods described herein are to be used at any particular time. The following description assumes that these methods are to be used.

In step 104, the femtocell access point determines whether it has any neighbour cells in the macro layer. In general, where the femtocell access point is located in a region covered by a cellular network, it will be able to identify at least one neighbour macrocell, in which case the process passes to step 106, in which the femtocell access point reads the biasing information broadcast by the neighbour macrocell or macrocells. In step 108, the femtocell access point uses this biasing information to calculate biasing offsets between itself and the neighbour macrocell or macrocells. This is described in more detail in WO2009/053710, and will not be described further herein.

If the femtocell access point determines in step 104 that it can identify no macrocell neighbours, or after setting the relevant biasing offsets in step 108, the process passes to step 110, in which the femtocell access point determines whether it has any femtocell neighbours.

The present invention is mainly concerned with a situation in which the femtocell access point does have femtocell neighbours, in which case the process passes to step 112, in which the femtocell access point reads the biasing information broadcast by the neighbour femtocell or femtocells. In addition, the femtocell access point has access to other information about the operation of the neighbour femtocell or femtocells, including the carrier frequency of each neighbour, and whether the neighbour is part of the some enterprise access group as the femtocell access point, or is part of another enterprise group.

The process then passes to step 114, in which the femtocell access point calculates biasing offsets towards the or each neighbouring femtocell. As will be described in more detail below, this involves the use of supporting data, including historical data 116 relating to the success of previous handovers towards specific neighbours, and information 118 relating to the loading of the or each neighbouring femtocell.

The process then passes to step 120, in which the femtocell access point calculates its own hysteresis value. As will again be described in more detail below, this involves the use of supporting data, including information 122 on its own instantaneous load.

Having calculated the various parameter values, the femtocell access point is able to begin operation, including broadcasting the calculated values, for use by any user equipment devices that establish a connection with the femtocell access point.

In step 124, the femtocell access point continuously tests while in use whether it able to detect any change in its neighbour cells. If so, the process returns to step 104, as the presence of new neighbours might mean that it would be desirable to change one or more of the mobility parameter values.

If there has been no change in the neighbour cells, the process passes to step 126, in which it is determined whether there is any change to any of the supporting data, such as the data 116, 118, 122, used in calculating the mobility parameter values. If so, the mobility parameter values can be recalculated, as required. If there has been no such change, the process returns to step 124.

Thus, the femtocell access point is able to set values for various mobility parameters, and these can be used, for example, to increase the likelihood of a handover being successful; to pre-emptively balance the loads on the femtocell access points within a group in order to improve the likelihood that a given user equipment device will be able to obtain service from a femtocell access point; and to increase or decrease the level of overlap between adjacent cells in a network of femtocell access points, again to improve the service available to user equipment devices registered to the network.

Aspects of the present invention provide methods for calculating various mobility parameters, and specifically cell reselection parameters, namely: the cell measurement thresholds (e.g. Sintrasearch & Sintersearch), the serving cell hysteresis value (i.e. $Qhyst1_s$ and $Qhyst2_s$), and individual cell offset values for each neighbour (e.g. $Qoffset1_{s,n}$ and $Qoffset2_{s,n}$).

As mentioned briefly above, the process uses dynamic information to update the cell reselection and biasing offsets.

Specifically, the femtocell access point uses historical data 116 relating to the success rates for previous handovers towards specific neighbours. In general, the femtocell will reduce the biasing offset towards neighbours that have an established history of failure of handover attempts, in order to reduce the probability that such handovers will be attempted, if there is any viable alternative. This can apply to both femtocell and macrocell neighbours.

In addition, the femtocell access point uses information 118 relating to the loading of the or each neighbouring femtocell. The femtocell will set the individual biasing offsets to a lower value for femtocell neighbours that are considered highly loaded, in order to reduce the likelihood of user equipment devices reselecting to, and handing over to, these loaded neighbours. This may be applied to femtocells that form part of a commonly-managed group, but may not apply to macrocell neighbours.

In addition, the femtocell access point calculates its own hysteresis value using information 122 on its own instantaneous load. If its loading is "low", the serving cell hysteresis is increased to make it rank better, and/or the individual cell offsets towards neighbour femtocells are reduced, so that it becomes less likely that a user equipment device will perform a cell reselection or handover away from the serving cell. By contrast, if its loading is "high", the serving cell hysteresis is reduced to make it rank lower, and/or the individual cell offsets toward neighbour femtocells are increased, to make it more likely that a user equipment will perform a cell reselection or handover away from the serving cell.

Examples of the respective calculations are set out below. It is assumed here that CPICH EcNo is used for cell reselection and handover decisions, but the same logic applies to cases where CPICH RSCP is used instead.

As discussed before, a femtocell access point will set measurement triggers to cause the UE to perform neighbour measurements in idle mode. When the UE detects that the quality of the serving femtocell has dropped below the configured triggering threshold, it will start measuring the quality of the neighbour cells. The configurable thresholds for other UTRAN cells are Sintrasearch and Sintersearch.

If the femtocell access point is sharing the chosen carrier frequency with the macro network, the femtocell will set Sintrasearch to a pre-configured value:

Sintrasearch=Sintrasearch_common.

If the femtocell access point is using a dedicated carrier frequency that is not shared by the macro network, but is shared with other femtocells, then the femtocell will increase the pre-configured value by a configurable margin $\Delta_{Sintra}$:

Sintrasearch=Sintrasearch_common+$\Delta_{Sintra}$.

This will cause the UE to search for other enterprise femtocells more often.

If the femtocell access point detects femtocells on other frequencies, and these frequencies are used by the macro network, the femtocell will set Sintersearch to a pre-configured value:

Sintersearch=Sintersearch_common.

If the femtocell access point detects femtocells on other frequencies, and these frequencies are not used by the macro network, the femtocell will increase the pre-configured value by a configurable margin: $\Delta_{sinter}$:

Sintersearch=Sintersearch_common+$\Delta_{Sinter}$.

This will cause the UE to search for other enterprise femtocells more often.

Once the UE in idle mode starts measuring neighbours, it ranks the measured neighbours together with the serving femtocell according to the following:

Serving cell Rank: Rs=CPICH EcNo+Qhyst$2_s$

Neighbour cell Rank: Rn=CPICH EcNo−Qoffset$2_{s,n}$.

At start-up, each femtocell sets its hysteresis value to a pre-configured value:

Qhyst$2_s$=Qhyst$2_s$ initial.

Periodically, the femtocell will check its current loading, and will use the following rules to update the used hysteresis level.

If the load on the femtocell access point is low, it applies a configurable margin $\Delta_{Hyst\_low}$ to Qhyst$2_s$. This margin should be positive, in order to encourage users to rank the femtocell higher and therefore stay longer on a lightly loaded femtocell. Thus:

Qhyst$2_s$=Qhyst$2_{s\_initial}$+$\Delta_{Hyst\_low}$

If the load on the femtocell access point is medium, it maintains or reverts to the pre-configured value:

Qhyst$2_s$=Qhyst$2_s$ initial.

If the load on the femtocell access point is high, it applies a configurable margin $\Delta_{Hyst\_high}$ to Qhyst$2_s$. This margin should be negative, in order to encourage users to rank the femtocell lower and therefore encourage those users to reselect to other femtocells which are less heavily loaded. Thus:

Qhyst$2_s$=Qhyst$2_s$ initial+$\Delta_{Hyst\_high}$

The offset to each UMTS neighbour (n) is set to:

Qoffset$2_{s,n}$=Qoffset$2_{s,n\_}$Initial+$\Delta_{Frequency\_n}$+$\Delta_{Group\_n}$+$\Delta_{Load\_n}$+$\Delta_{Type\_n}$ In the calculation of the offset:

Qoffset$2_{s,n}$_Initial is a pre-configured value.

In the calculation of the offset, above, $\Delta_{Frequency\_n}$ is an additional margin to increase or decrease the ranking based on carrier frequency of neighbour (n). This margin is calculated automatically by the femtocell access point for each neighbour as follows:

for macrocell neighbours, $\Delta_{Frequency\_n}$=0 for femtocell neighbours that are on the same frequency:

$\Delta_{Frequency\_n}$=$\Delta_{Frequency\_same}$ for femtocell neighbours that are on a different frequency, if the femtocell detects that neighbour at a high EcNo level:

$\Delta_{Frequency\_n}$=$\Delta_{Frequency\_other\_HQ}$ if the femtocell detects that neighbour at a medium EcNo level:

$\Delta_{Frequency\_n}$=$\Delta_{Frequency\_other\_MQ}$ if the femtocell detects that neighbour at a low EcNo level:

$\Delta_{Frequency\_n}$=$\Delta_{Frequency\_other\_LQ}$, where $\Delta_{Frequency\_other\_HQ}$>$\Delta_{Frequency\_other\_MQ}$>$\Delta_{Frequency\_other\_LQ}$ This will cause UEs to reselect stronger neighbours slightly later. The definitions of high, medium, and low EcNo levels can be configurable, but, as an example:

Neighbour high EcNo level means>−6 dB

Neighbour medium EcNo level means −6 dB>Neighbour quality>−12 dB

Neighbour high EcNo level means<12 dB.

In the calculation of the offset, above, $\Delta_{Group\_n}$ is an additional margin to decrease the ranking of femtocells that do not belong to the same group. This margin is calculated automatically by the femtocell access point for each femtocell scrambling code.

If the femtocell detects that the scrambling code is used by another femtocell that does not belong to the same group, then it will set:

$\Delta_{Group\_n}$=$\Delta_{not\_in\_group}$

If the femtocell detects that the scrambling code is used by at least one other femtocell that belongs to the same group, then it will set:

$\Delta_{Group\_n}$=$\Delta_{in\_group}$, where $\Delta_{not\_in\_group}$ has to be higher than $\Delta_{in\_group}$, and both are pre-configured values.

In the calculation of the offset, above, $\Delta_{Load\_n}$ is an additional margin that can be used to increase the ranking of a neighbour (n) based on a reported load that is lower than average. This margin is set automatically by the femtocell access point.

If neighbour (n) is a macro cell then $\Delta_{Load\_n}$=0

If neighbour (n) is a femtocell and the load on neighbour (n) is high, $\Delta_{Load\_n}$=$\Delta_{Load\_high}$ If neighbour (n) is a femtocell and the load on neighbour (n) is medium, $\Delta_{Load\_n}$=0

If neighbour (n) is a femtocell and the load on neighbour (n) is low, $\Delta_{Load\_n}$=$\Delta_{Load\_low}$, where $\Delta_{Load\_high}$ is a positive value, and $\Delta_{Load\_low}$ is a negative value, and both are pre-configured values.

In the calculation of the offset, above, $\Delta_{Type\_n}$ is an additional margin that can be used to differentiate the rankings of neighbouring femtocells from neighbouring macrocells. This margin is set automatically by the femtocell access point.

If neighbour (n) is a macrocell, $\Delta_{Type\_n}$=0

If neighbour (n) is a femtocell, $\Delta_{Type\_n}$=$\Delta_{Type\_Femto}$, where $\Delta_{Type\_Femto}$ is a negative value, such that it reduces the offset and increases the ranking of neighbour (n).

The modification of mobility parameters is also used to modify handover triggers that are used by a user equipment device in connected mode, for example in a call. In general terms, the operation of the handover procedure is that the UE measures neighbour cells which are listed in a neighbour list communicated to it by the network. When the quality of a neighbour exceeds a certain pre-configured threshold, that neighbour is added to the handover candidate list. When the quality drops below another pre-configured threshold, the neighbour is removed from the handover candidate list. The actual handover event happens when the quality of the current serving cell drops below a pre-configured threshold, and there are potential handover target cells listed in the handover candidate list.

In the following text we define:

Meas_EcNo$_n$: the measured EcNo of neighbour (n).

Meas_EcNo$_{server}$: the measured EcNo of the serving femtocell.

EcNo_Candidate_cell$_n$: the threshold used to add neighbour (n) to candidate cell list.

EcNo_HO_Trigger$_{server}$: the threshold used to trigger Handover.

HOoffset$_n$: the offset applied to EcNo measurements of neighbour (n) used for candidate list add/remove decisions.

HOoffset$_{server}$: the offset applied to the EcNo measurement of the current serving cell for the handover trigger decision.

In more detail, a neighbour (n) is added to the candidate list when:

$$Meas\_EcNo_n + \Delta_{CL\_n} > EcNo\_Candidate\_cell_n,$$

where:

Meas_EcNo$_n$ is the measured EcNo of neighbour (n),

EcNo_Candidate_cell$_n$ is a threshold used to add neighbour (n) to the candidate list, and $\Delta_{CL\_n}$ is an additional margin that is used to offset neighbour (n) for use as a candidate handover cell.

This additional margin is calculated automatically by the femtocell as follows:

$$\Delta_{CL\_n} = \Delta_{Frequency\_n} + \Delta_{Group\_n} + \Delta_{Load\_n} + \Delta_{Type\_n} + \Delta_{HO\_success\_n}$$

where:

$\Delta_{Frequency}$, $\Delta_{Group}$, $\Delta_{Load}$ and $\Delta_{Type}$ are the same margins described above with reference to idle mode cell reselection, and $\Delta_{HO\_success\_n}$ is a margin used to reflect the rate of previous successful handover attempts to neighbour (n).

In further detail, if the rate of previous successful handover attempts to neighbour (n) is acceptable, then:

$$\Delta_{HO\_success\_n} = \Delta_{HO\_success\_ok}$$

If the rate of previous successful handover attempts to neighbour (n) is not acceptable, then:

$$\Delta_{HO\_success\_n} = \Delta_{HO\_success\_Nok}$$

where the acceptable rate of successful handover attempts is a pre-configured parameter (e.g. 85%).

The femtocell will trigger handover to one of the candidate cells when:

$$Meas\_EcNo_{server} + \Delta_{HO} > EcNo\_HO\_Trigger_{server}$$

where:

Meas_EcNo$_{server}$ is the measured EcNo of the serving femtocell,

EcNo_HO_Trigger$_{server}$ is the threshold used to trigger handover, and $\Delta_{HO}$ is an additional margin that is used to increase the probability of handover.

This additional margin is calculated automatically by the femtocell as follows:

If the serving femtocell load is low, the femtocell applies a configurable margin:

$$\Delta_{HO} = \Delta_{HO\_low}$$

If the serving femtocell load is medium, the femtocell applies a configurable margin:

$$\Delta_{HO} = 0$$

If the serving femtocell load is high, the femtocell applies a configurable margin:

$$\Delta_{HO} = \Delta_{HO\_high}, \text{ where}$$

$\Delta_{HO\_low} < 0$ and $\Delta_{HO\_high} > 0$, such that handovers to highly loaded cells are discouraged, and handovers to lightly loaded cells are promoted.

There are thus described various techniques by which a femtocell access point can manipulate various mobility parameters to provide a mechanism to achieve desirable ends, such as pre-emptive load balancing by using load information, and more successful handovers by using a history of successful handover attempts.

The invention claimed is:

1. A method, for use in a basestation of a cellular communications network comprising a plurality of other basestations, for controlling mobility, the method comprising, in the basestation:
   receiving from one of the other basestations a report relating to a load on the one of the other basestations;
   determining a success rate for previous handover attempts to the one of the other basestations;
   setting a value for at least one mobility parameter determining mobility between the basestation and the one of the other basestations, based on said reported load and based on said determined success rate; and
   broadcasting the set value for the mobility parameter,
   wherein the mobility parameter is a parameter intended for use by user equipment devices for ranking candidate cells when making a decision about a possible handover or a possible cell reselection,
   wherein, in the event that said report indicates that the load on the one of the other basestations is high, setting the value for the at least one mobility parameter comprises setting the value for the mobility parameter that tends to reduce the rank of the cell served by the one of the other basestations, and
   wherein, in the event that said report indicates that the load on the one of the other basestations is low, setting the value for the at least one mobility parameter comprises setting the value for the mobility parameter that tends to increase the rank of the cell served by the one of the other basestations.

2. A method as claimed in claim 1, wherein the mobility parameter is a neighbour offset parameter.

3. A method as claimed in claim 1, comprising:
   receiving from a plurality of the other basestations respective reports relating to the load on the other basestations; and
   setting respective values for at least one mobility parameter determining mobility between the basestation and the other basestations, based on said reported loads; and
   broadcasting the set values.

4. A method as claimed in claim 1, wherein the basestation is connected to one or more other basestation by means of a local area network, and wherein the basestation receives the report relating to the load on the or each other basestation over the local area network.

5. A method as claimed in claim 1, comprising:
   transmitting to the other basestations a report relating to the load on the basestation itself.

6. A method, for use in a basestation of a cellular communications network comprising a plurality of other basestations, for controlling mobility, the method comprising, in the basestation:
  determining a load on the basestation;
  determining a success rate for previous handover attempts to the one of the other basestations;
  setting a value for at least one mobility parameter determining mobility between the basestation and the other basestations, based on said determined load and based on said determined success rate; and broadcasting the set value for the mobility parameter,
  wherein the mobility parameter is a parameter intended for use by user equipment devices for ranking candidate cells when making a decision about a possible handover,
  wherein, in the event that the load on the basestation is high, setting the value for the at least one mobility parameter comprises setting the value for said mobility parameter that tends to reduce the rank of the cell served by the basestation, and
    wherein, in the event that the load on the basestation is low, setting the value for the at least one mobility parameter comprises setting the value for said mobility parameter that tends to increase the rank of the cell served by the basestation.

7. A method as claimed in claim 6, wherein the mobility parameter is a hysteresis parameter.

* * * * *